(12) United States Patent
Xu et al.

(10) Patent No.: US 8,451,501 B2
(45) Date of Patent: May 28, 2013

(54) WATERMARK DECODING VIA SPECTRAL ANALYSIS OF PIXEL SPACING

(75) Inventors: Beilei Xu, Penfield, NY (US); Joseph C. Sheflin, Macedon, NY (US); Shen-Ge Wang, Fairport, NY (US); Robert P. Loce, Webster, NY (US); Jack T. LeStrange, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 331 days.

(21) Appl. No.: 12/966,244

(22) Filed: Dec. 13, 2010

(65) Prior Publication Data

US 2012/0148087 A1    Jun. 14, 2012

(51) Int. Cl.
*H04N 1/405* (2006.01)
*H04N 1/40* (2006.01)
*G06K 9/00* (2006.01)
*G06K 9/46* (2006.01)

(52) U.S. Cl.
USPC ......... 358/3.06; 358/3.28; 382/100; 382/162; 382/191; 382/232; 382/254

(58) Field of Classification Search
USPC ............... 358/3.06, 3.28; 382/100, 162, 191, 382/232, 254
See application file for complete search history.

(56) References Cited

U.S. PATENT DOCUMENTS

| 4,860,237 A | 8/1989 | Curry |
| 6,731,409 B2 * | 5/2004 | Wang ........................... 358/3.28 |
| 7,127,112 B2 * | 10/2006 | Sharma et al. ................ 382/232 |

OTHER PUBLICATIONS

Bulan et al., "Geometric distortion signatures for printer identification," IEEE 2009, ICASSP 2009, pp. 1401-1404, ECE Dept., University of Rochester, Rochester, NY 14627.
U.S. Appl. No. 12/966,164, filed Dec. 13, 2010, Xu et al.

* cited by examiner

*Primary Examiner* — Charlotte M Baker
(74) *Attorney, Agent, or Firm* — Fay Sharpe LLP (57) ABSTRACT

Provided are methods, apparatus and systems related to watermark decoding via spectral analysis of an image. According to one exemplary method, spectral analysis is performed to decode a watermark within an image, where the pixel spacing associated with the image was modulated to encode the watermark.

23 Claims, 12 Drawing Sheets

| | | | | | | | | | | | |
|---|---|---|---|---|---|---|---|---|---|---|---|
| 120.3 | 120.1 | 120.5 | 120.7 | 120.0 | 119.9 | 120.9 | 121.0 | 120.1 | 120.1 | 120.9 | 120.7 | 120.0 |
| 120.3 | 120.1 | 120.5 | 120.7 | 120.0 | 120.0 | 120.9 | 121.0 | 120.1 | 120.1 | 120.9 | 120.7 | 120.0 |
| 120.3 | 120.1 | 120.5 | 120.7 | 120.0 | 119.9 | 120.9 | 121.0 | 120.1 | 120.0 | 120.9 | 120.7 | 120.0 |
| 120.3 | 120.1 | 120.4 | 120.7 | 120.0 | 119.9 | 120.9 | 121.0 | 120.1 | 120.0 | 121.0 | 120.7 | 119.9 |
| 120.3 | 120.1 | 120.4 | 120.7 | 120.0 | 120.0 | 120.9 | 121.0 | 120.1 | 120.0 | 121.0 | 120.8 | 119.9 |
| 120.3 | 120.1 | 120.4 | 120.7 | 120.0 | 119.9 | 120.9 | 121.0 | 120.1 | 120.0 | 120.9 | 120.8 | 120.0 |
| 120.3 | 120.1 | 120.4 | 120.7 | 120.0 | 119.9 | 120.9 | 121.0 | 120.1 | 120.0 | 120.9 | 120.8 | 119.9 |
| 120.3 | 120.1 | 120.5 | 120.7 | 120.0 | 119.9 | 120.9 | 121.0 | 120.1 | 120.0 | 121.0 | 120.8 | 119.9 |
| 120.3 | 120.1 | 120.5 | 120.7 | 120.0 | 119.9 | 120.9 | 121.0 | 120.1 | 120.0 | 121.0 | 120.9 | 119.9 |
| 120.3 | 120.0 | 120.5 | 120.7 | 120.0 | 119.9 | 120.9 | 121.0 | 120.1 | 120.0 | 121.0 | 120.9 | 120.0 |
| 120.3 | 120.1 | 120.5 | 120.7 | 120.0 | 119.9 | 120.9 | 120.9 | 120.1 | 120.0 | 120.9 | 120.9 | 120.0 |
| 120.3 | 120.1 | 120.4 | 120.7 | 120.0 | 119.9 | 120.9 | 120.9 | 120.1 | 120.0 | 120.9 | 120.9 | 120.0 |
| 120.3 | 120.1 | 120.4 | 120.7 | 120.0 | 119.9 | 121.0 | 121.0 | 120.1 | 120.1 | 120.9 | 121.0 | 119.9 |
| 120.3 | 120.0 | 120.4 | 120.7 | 120.0 | 120.0 | 120.9 | 121.0 | 120.1 | 120.0 | 120.9 | 121.0 | 119.9 |
| 120.2 | 120.0 | 120.4 | 120.7 | 120.0 | 120.0 | 121.0 | 121.0 | 120.1 | 120.1 | 120.9 | 120.9 | 119.9 |
| 120.2 | 120.0 | 120.4 | 120.7 | 120.0 | 119.9 | 120.9 | 121.0 | 120.1 | 120.0 | 120.9 | 120.9 | 119.9 |
| 120.3 | 120.0 | 120.4 | 120.7 | 120.0 | 119.9 | 120.9 | 121.0 | 120.1 | 120.0 | 120.9 | 121.0 | 119.9 |
| 120.3 | 120.0 | 120.4 | 120.6 | 120.0 | 120.0 | 120.9 | 120.9 | 120.1 | 120.0 | 120.9 | 121.0 | 120.0 |
| 120.3 | 120.0 | 120.4 | 120.6 | 120.0 | 120.0 | 120.9 | 120.9 | 120.1 | 120.0 | 120.9 | 121.0 | 120.0 |
| 120.3 | 120.0 | 120.5 | 120.7 | 120.0 | 120.0 | 120.9 | 120.9 | 120.1 | 120.0 | 120.9 | 120.9 | 120.0 |
| 120.3 | 120.1 | 120.5 | 120.7 | 120.0 | 120.0 | 121.0 | 120.9 | 120.1 | 120.0 | 120.9 | 120.9 | 120.0 |
| 120.3 | 120.1 | 120.4 | 120.6 | 120.0 | 120.0 | 121.0 | 120.9 | 120.1 | 120.0 | 121.0 | 120.9 | 120.0 |
| 120.2 | 120.1 | 120.4 | 120.6 | 120.0 | 120.0 | 121.0 | 120.9 | 120.2 | 120.0 | 121.0 | 120.9 | 120.0 |
| 120.1 | 120.1 | 120.4 | 120.6 | 120.0 | 120.0 | 121.0 | 120.9 | 120.1 | 120.0 | 121.0 | 120.9 | 120.0 |
| 120.1 | 120.1 | 120.4 | 120.6 | 120.0 | 120.0 | 121.0 | 120.9 | 120.2 | 120.0 | 121.0 | 120.9 | 120.0 |
| AVERAGE | | | | | | | | | | | | |
| 120.3 | 120.1 | 120.4 | 120.7 | 120 | 119.9 | 120.9 | 121.0 | 120.1 | 120.0 | 120.9 | 120.9 | 120.0 |

FIG. 12

WATERMARK DECODING VIA SPECTRAL ANALYSIS OF PIXEL SPACING

CROSS REFERENCE TO RELATED PATENTS AND APPLICATIONS

"WATERMARK ENCODING VIA PIXEL SPACING MODULATION," by Xu et al., application Ser. No. 12/966,164, filed on Dec. 13, 2010, is incorporated herein by reference in its entirety.

BACKGROUND

Many print applications and markets require watermarks on the hardcopy prints to encode information on job integrity or security. In certain markets and countries, security features are mandatory to prevent fraud. There are many different digital watermarking technologies and many of them are implemented by modifying or special processing of the documents. A well known current practice of "invisible" watermarking is the use of a yellow dots method, which is image rendering independent, to encode printer identification and time/date. However, some marking processes cannot use yellow dots because they suppress the development of black toner resulting in visible yellow dots in black regions of a print. Notably, the lack of a security encoding method has presented a challenge in markets that require security features, such as in government facilities.

It is very desirable to develop an alternative method, which is image rendering independent, to encode security data via invisible watermarks in image output devices such as laser printers.

INCORPORATION BY REFERENCE

U.S. Pat. No. 4,860,237, by Curry, issued Aug. 22, 1989 and entitled "SCAN LINEARITY CORRECTION."

"Geometric distortion signatures for printer identification," O. Bulan, J. Mao, and G. Sharma, in Proc. IEEE International Conference Acoustics Speech and Signal Processing, Apr. 19-24, 2009, Taipei, Taiwan, pages 1401-1404.

BRIEF DESCRIPTION

In one embodiment of this disclosure, described is a method of decoding an encoded watermark within an image rendered on an image output device, the image output device associated with a pixel grid including a first predetermined number of substantially equally spaced pixels in a first direction, and a second predetermined number of substantially equally spaced pixels in a second direction for rendering the image, and the watermark encoded via pixel spacing modulation, the method comprising: a) scanning the image rendered on the image output device; b) determining one or more image segments associated with the scanned image that include the encoded watermark; c) applying spectral analysis to determine the pixel spacing associated with each of the one or more image segments; d) decoding the image segments to determine the coded watermark, the decoding based on the determined pixel spacing associated with each of the one or more image segments.

In another embodiment of this disclosure, described is a printing apparatus comprising: an image output device for rendering an image on a media substrate; and a controller configured to receive a representation of an image for rendering on the image output device, the controller configured to execute instructions to decode an encoded watermark within an image rendered on the media substrate, the image output device associated with a pixel grid including a first predetermined number of substantially equally spaced pixels in a first direction, and a second predetermined number of substantially equally spaced pixels in a second direction for rendering the image and the watermark encoded via pixel spacing modulation, the method comprising: a) scanning the image rendered on the image output device; b) determining one or more image segments associated with the scanned image that include the encoded watermark; c) applying spectral analysis to determine the pixel spacing associated with each of the one or more image segments; d) decoding the image segments to determine the coded watermark, the decoding based on the determined pixel spacing associated with each of the one or more image segments. In still another embodiment of this disclosure, described is a computer program product comprising: a computer-usable data carrier storing instructions that, when executed by a computer, cause the computer to perform a method of decoding a watermark within an image rendered on an image output device, the image output device associated with a pixel grid including a first predetermined number of substantially equally spaced pixels in a first direction, and a second predetermined number of substantially equally spaced pixels in a second direction for rendering the image and the watermark encoded via pixel spacing, the method comprising: a) scanning the image rendered on the image output device; b) determining one or more image segments associated with the scanned image that include the encoded watermark; c) applying spectral analysis to determine the pixel spacing associated with each of the one or more image segments; d) decoding the image segments to determine the coded watermark, the decoding based on the determined pixel spacing associated with each of the one or more image segments.

BRIEF DESCRIPTION OF THE DRAWINGS

FIG. 12 shows experimental results associated with a decoded bit pattern, where frequency peaks from 21 segments of a scanned image were detected.

DETAILED DESCRIPTION

According to one aspect of this disclosure, provided are watermarking methods, systems and apparatus to encode security data via modulating the pixel spacing of pixels associated with an image, for example, but not limited pixel clock frequency modulation. For example, when a clock frequency is deviated from nominal, pixels become accordingly more or less frequent in the cross-process direction, which in turn modifies the printed halftone frequency. For small deviations from nominal, IQ (Image Quality) defects due to pixel placement deviation are invisible, but can be detected through spectral analysis of the scanned halftone. Hence, the provided methods encode invisible watermarks via pixel clock frequency control that induces halftone frequency variation. The disclosed embodiments require no additional hardware over a system that has a variable pixel clock. Notably, visible defects cannot be observed at a pixel clock frequency variation of 0.5% or less, while pixel space modulated watermarks can be successfully decoded at a pixel clock variation of 0.5%. The disclosed methods and systems can be part of a tool box of security watermark techniques that can be applied to a page.

According to another aspect of this disclosure, provided are methods, systems and apparatus for clockmark decoding, for example via spectral analysis of scanned halftoned prints. The method includes the following steps:

1) determine scanned image segments to be analyzed;
2) apply spectral analysis on the scanned image segments to extract their halftone frequencies;
3) detect halftone frequency shifts between segments and use the information to decode the clockmarks; and
4) verify the decoded bit streams using the redundancy that was used in the encoding process.

The method has been tested using real prints and the method is able to decode encoded clockmarks at 0.5% frequency variation where no IQ defects are observed. The method requires no additional hardware over a system that has a variable pixel clock, for example see U.S. Pat. No. 4,860,237, issued Aug. 22, 1989, entitled "Scan Linearity Correction," by Curry.

As previously discussed, this disclosure provides a watermarking method that encodes security data via pixel clock frequency modulation, according to one exemplary embodiment. When a pixel clock frequency is deviated from nominal, pixels become accordingly more or less frequent in the cross-process direction, which in turn modifies the printed halftone frequency. For small deviations from nominal, IQ defects due to pixel placement deviation is invisible, but can be detected through spectral analysis of the scanned halftone. Hence, the disclosed method encodes invisible watermarks via pixel clock frequency control that induces halftone frequency variation. The method includes the following steps:

1) calibration—determine the maximum number of bits can be encoded in the cross-process and process directions without inducing visible defects;
2) watermark conversion—convert binary watermark data into a clock frequency profile or multiple profiles that drive different scanlines;
3) combine watermark profile with compensation profile—combine the encoded frequency profile with any required scan nonlinearity correction profile; and
4) print—drive the laser using the combined profile to drive the pixel clock.

Notably, the method requires no additional hardware over a system that has a variable pixel clock.

Furthermore, this disclosure provides a method for watermark detection via spectral analysis of scanned halftone prints. The method includes the following steps:

1) determine the scanned image segments to be analyzed;
2) apply spectral analysis on the scanned image segments to extract their halftone frequencies;
3) detect halftone frequency shifts between segments and use the information to decode the clockmarks; and
4) verify the decoded bit streams using the redundancy that was used in the encoding process.

The clockmark has the advantages of utilizing the existing hardware capability. The disclosure provides an effective method for clockmark decoding.

Variable frequency pixel clocks have been conventionally used to compensate for a nonuniform speed of a scanning spot in a ROS-based printer, see U.S. Pat. No. 4,860,237 to Curry. The nonuniform speed is due to distortion in the ROS optical system and can result in cross-process pixel placement errors if not compensated for. These adjustable clocks are often referred to as nonlinear clocks or anamorphic clocks. The clocks are driven by a clock profile that defines the desired pixel placement and width. When the clock frequency is varied from nominal, pixels accordingly become closer or further apart from each other, i.e. the pixel spacing changes. Conventionally, this pixel adjustment is applied to compensate for optical distortion, so that the resulting pixels are uniformly sized and spaced on a print.

According to one exemplary embodiment of this disclosure, pixel clock frequency modulation performed in addition to any needed ROS distortion compensation so that the pixel location and pixel spacing is modulated, leading to a modulation of halftone frequency. If the variation from the nominal is small, IQ defects due to this frequency change is invisible.

The exemplary method includes the following steps:

1) Calibration—determine the maximum number of bits that can be encoded in the cross-process and process directions without inducing visible defects.
2) Watermark conversion—convert binary watermark data into a clock frequency profile to drive scanlines or multiple profiles that drive different scanlines.
3) Combine watermark profile with compensation profile—combine the encoded frequency profile with any required scan nonlinearity correction profile.
4) Print—drive the laser using the combined profile to drive the pixel clock.

1) Calibration—Determine the Maximum Number of Bits that can be Encoded in the Cross-Process and Process Directions without Inducing Visible Defects.

Ideally, a calibration process is performed for a given printer, halftone, and settings under which a watermarked print will be produced. For maximum IQ and encoding capacity, calibration is performed for each specific image that will receive a watermark. Alternatively, experience from previous printing on the same or related printing processes serves as a guide and is a substitute for a detailed calibration. Presented below is one example of a calibration method used for one printing fixture.

Figure 1:
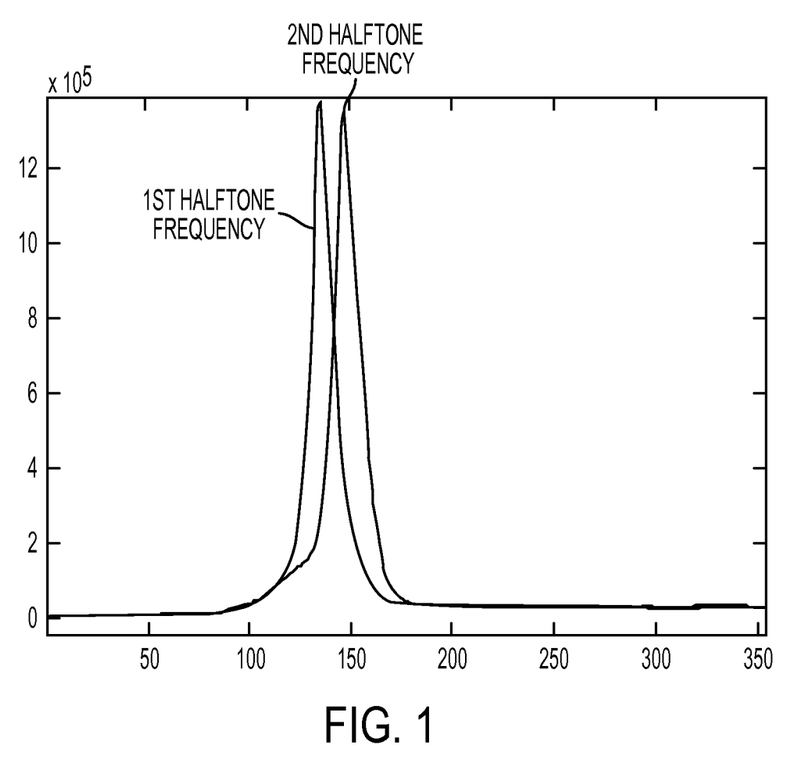
FIG. 1 is a Yulear-Walker spectral analysis showing two halftone frequency peaks corresponding to the clock frequency at the nominal frequency and 0.5% higher frequency, respectively.

For the image marking system under consideration, a series of uniform full-page halftone patterns at 50% area coverage was generated while varying pixel clock frequency at various levels (e.g. 0.3%, 0.5%, and 1%) from the nominal frequency with different intervals (0.5", 1", and 2") in the cross-process direction. The ideal level of frequency variation is at the level where there is no visible IQ defect on the hardcopy prints while spectral analysis can clearly identify the halftone frequency peaks corresponding to different clock frequencies as shown in FIG. 1. As shown in FIG. 1, images were printed with the clock frequency set at 0.5% higher than the nominal frequency at 1" intervals in the cross-process direction. FIG. 1 shows that the two halftone frequency peaks were separated from each other enough to enable accurate discrimination with no visible IQ defects on the hardcopy prints. Hence, every inch in the process direction can be used to encode one bit of watermark. Notably, the number of bits that can be encoded in the cross-process direction depends on several factors such as the decoding scheme, the response time for changing the clock frequency, printer/scanner noise, image content, halftone frequency and type, frequency at the nominal frequency and 0.5% higher frequency, respectively.

Since the encoding methods disclosed herein depend on halftoned regions, non halftoned regions should not be used to provide encoded information. For example, according to one exemplary embodiment, the images are preprocessed into halftone regions and non halftone images, and only the halftone regions are used for encoding.

To increase the number of bits that can be encoded into a single page, in addition to encoding watermarks in the cross-process direction, watermark bits can also be encoded in the process direction. That is, a different clock profile can be used for different process-direction image segments. In the current implementation, each image segment consisted of 50 scanlines and 20~30 segments are encoded with the same watermark for built-in redundancy to improve decoding accuracy. The length of each image segment is determined by a tradeoff between print noise and required encoding capacity. For example, if the hardcopy prints are very noisy, a longer process-direction image segment can be used to reduce the noise, whereas low noise conditions allow the length to be shortened to increase encoding capacity.

Max encoded bits=floor[(paper length−border)/(require min length*required redundancy)]*number of strips (e.g. floor (paper width-border)/required min width).

Example: for regular paper stock (e.g., 14"×8.5" paper), with 36 level redundancy (very conservative)

Max encoded bits=floor[(8.5"−1")/(1/12"×36)]*floor (14−1)/1"~39 bits.

For typical security encoding, 16 to 32 bits should be sufficient. Though section width is constrained by frequency resolution, strip length and redundancy can be further optimized for better signal-to-noise ratio (noisy images, image content dependence, . . . ) when the required number of bits is less than the maximum encoding bits.

2) Watermark Conversion—Convert Binary Watermark Data into a Clock Frequency Profile to Drive a Scan Line or Multiple Profiles that Drive Different Scan Lines.

Figure 2:
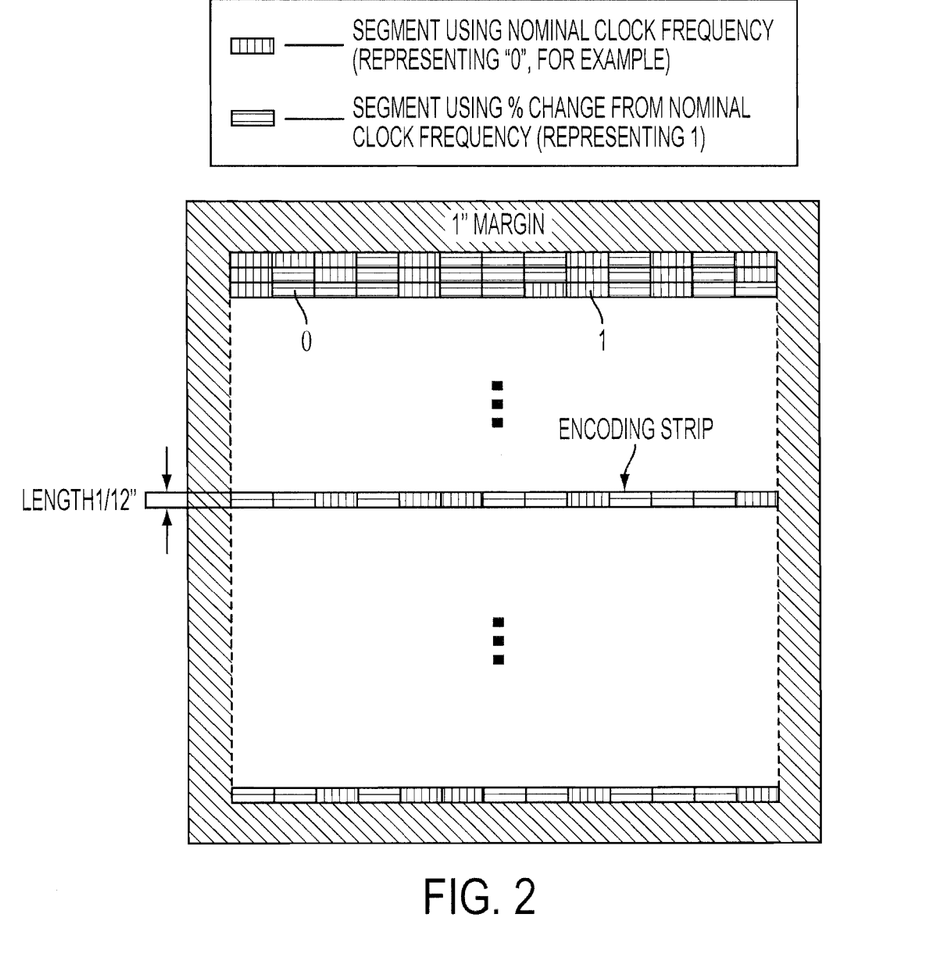
FIG. 2 is a schematic of a page layout for watermark encoding via clock frequency variation, according to an exemplary embodiment of this disclosure.
Figure 3:
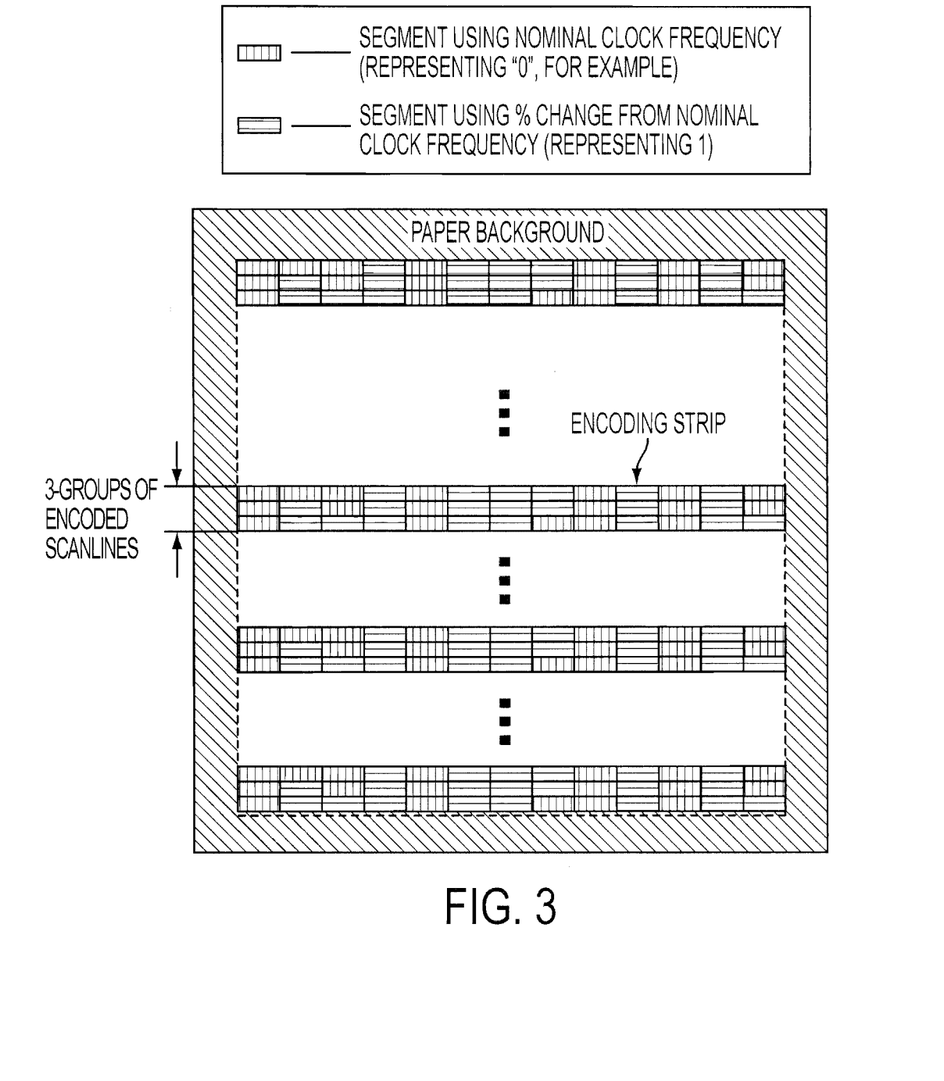
FIG. 3 is an illustration of blocks of a watermark repeated throughout a page, either randomly or periodically, at predefined locations.

To encode watermarks, the page is first divided into multiple strips (e.g., 1/12" wide in the process direction) as shown in FIG. 2. Each of the segments in FIG. 2 represents a 1 or 0 (single bit) of the watermark with the horizontally hatched sections representing a region written with nominal clock frequency and the vertically hatched sections representing a region written with a slightly higher/lower clock frequency (e.g. less or equal to 0.5% higher/lower), respectively. The required number of bits may require that the string of bits is represented by multiple strips. For example, FIG. 3 illustrates an encoded watermark requiring three groups of encoded scanlines.

Figure 4:
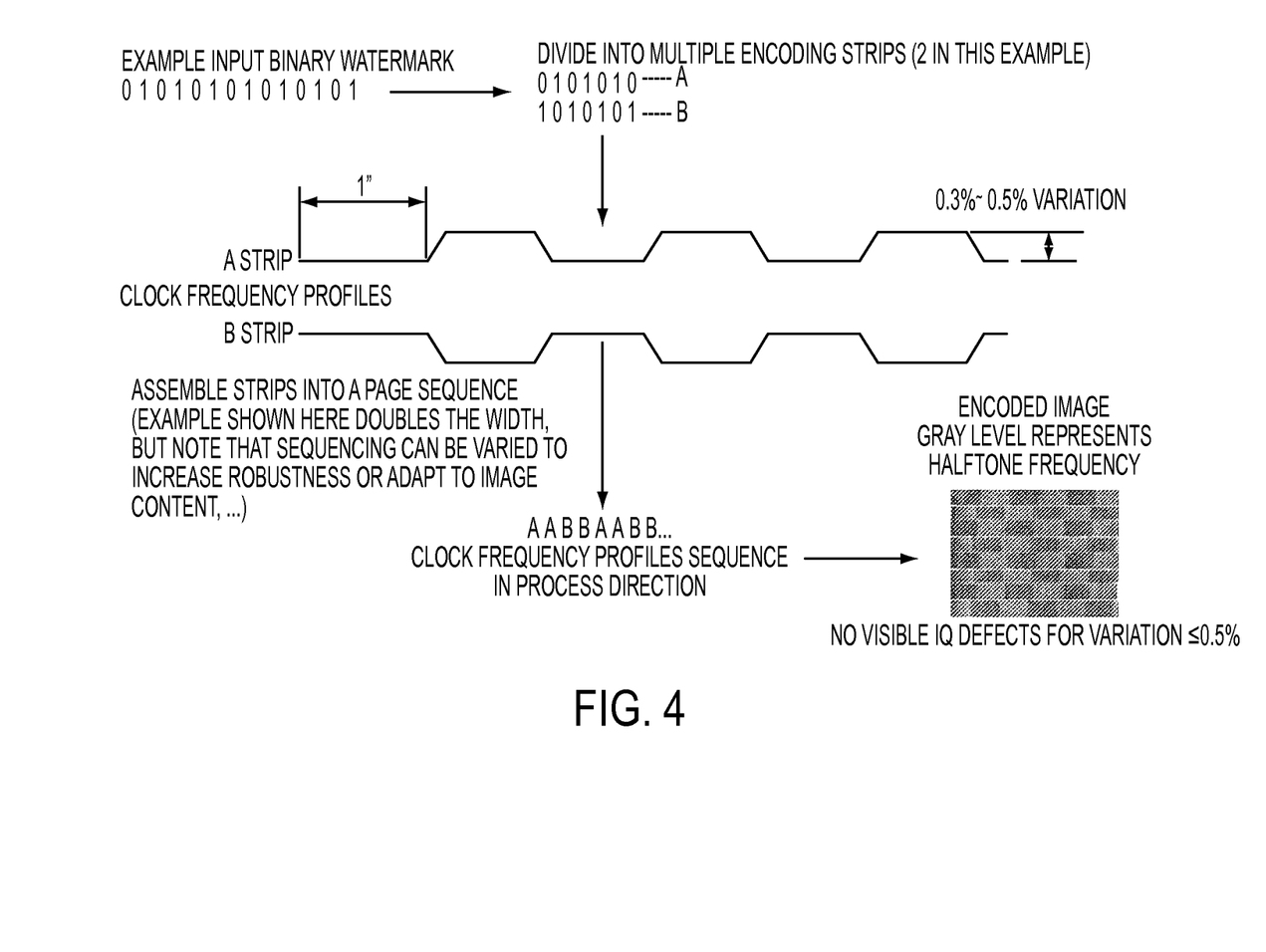
FIG. 4 is a process flow chart illustrating the conversion of a watermark bit stream to frequency profiles for encoding the watermark.

Depending on the length of the watermark bit stream (i.e., longer than the possible encoding bits in the cross-process direction), the incoming bit stream is divided into multi-bit segments, preferably to have the same number of bits among the segments. For each segment, the binary bits are converted into a frequency profile as shown in FIG. 4, where the 0's correspond to the nominal frequency and 1's correspond to higher/lower frequency from the nominal. Multiple segments are converted into multiple profiles, which are used to drive the pixel clock for different image segments as the image writing proceeds down the process directions. The lower right image in FIG. 4 gives an example of an encoded image, where the frequency variation is set very high to demonstrate the encoded information. This schematic image is actually constructed from a scan of a watermarked image using a very high frequency variation such that the halftones print shows different density for the different clock frequency regions. In practice, the frequency variation is kept low (e.g. below 0.5%) so that the IQ difference between high and low clock frequency regions will not be visible.

3) Combine Watermark Profile with Compensation Profile—Combine the Encoded Frequency Profile with any Required Scan Nonlinearity Correction Profile.

Because the pixel clock is also used to control/correct pixel placement in the cross-process direction, the watermark encoded profiles have to be combined with frequency profiles used for scan nonlinearity correction to generate the final profile that drives the ROS. So, the frequency modulation that we propose is "riding on top of" the slow, smooth changes in clock frequency used for compensation of ROS nonlinearity.

4) Print—Drive the Laser using the Combined Profile to Drive the Pixel Clock.

Experiment and Results

The method disclosed hereto, has been tested on a laser printing system. A full-page halftone at 50% area coverage was used to encode watermarks. The clock frequency was varied by 0.3%, 0.5%, 1% and 3% for every 2" for encoding bit stream 0 0 1 1 0 0 1 1 0 0 1 on 14"×8.5" paper. No IQ defects were observed for frequency variation at or below 0.5%. Images were then scanned offline at 600 dpi resolution and the watermark was decoded by spectral analysis.

Figure 6:
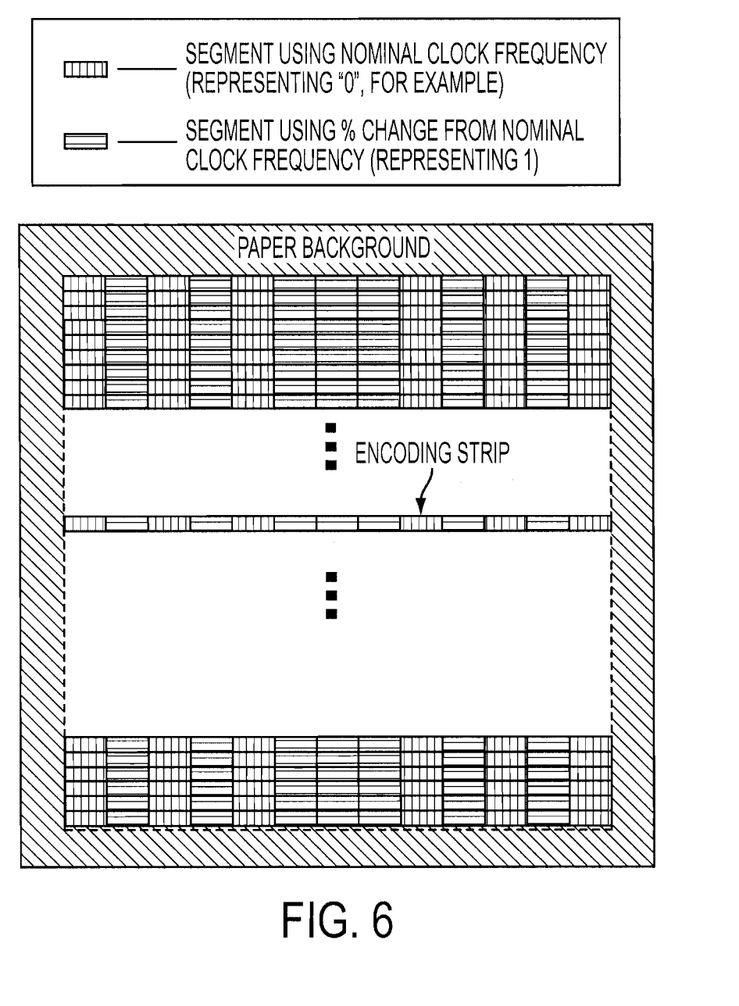
FIG. 6 is an illustration of watermarks repeated in a column and row fashion.

With reference to FIG. 6, illustrated is another exemplary embodiment of an encoding method according to this disclosure. As shown, a single encoded strip is used to provide the watermark information, where the encoded strip is repeated throughout the image to provide redundancy. In other words, redundant encoded strips are used to provide a more robust encoding system.

Figure 7:
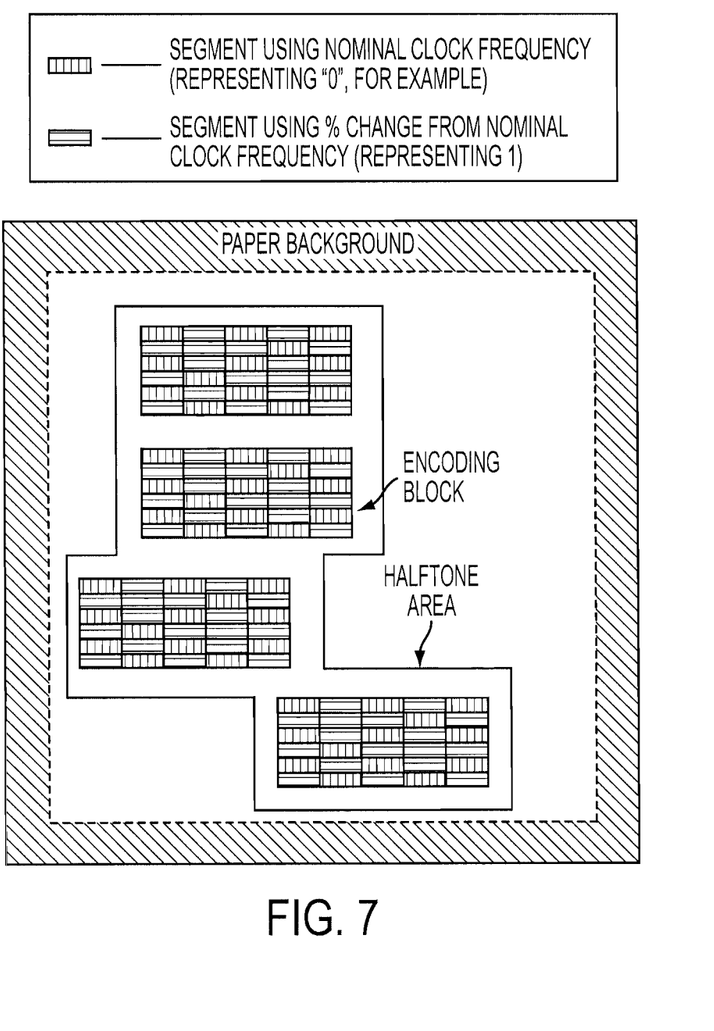
FIG. 7 illustrates image content dependent watermark locations, whereby halftone areas of the image are identified and the identified areas are filled with repeating watermark blocks.

With reference to FIG. 7, illustrated is another exemplary embodiment of an encoding method according to this disclosure. Here, an encoded block provides multiple encoded strips to represent binary data associated with the watermark. To provide a robust system, the encoded block is repeated several times within the rendered image.

Figure 8:
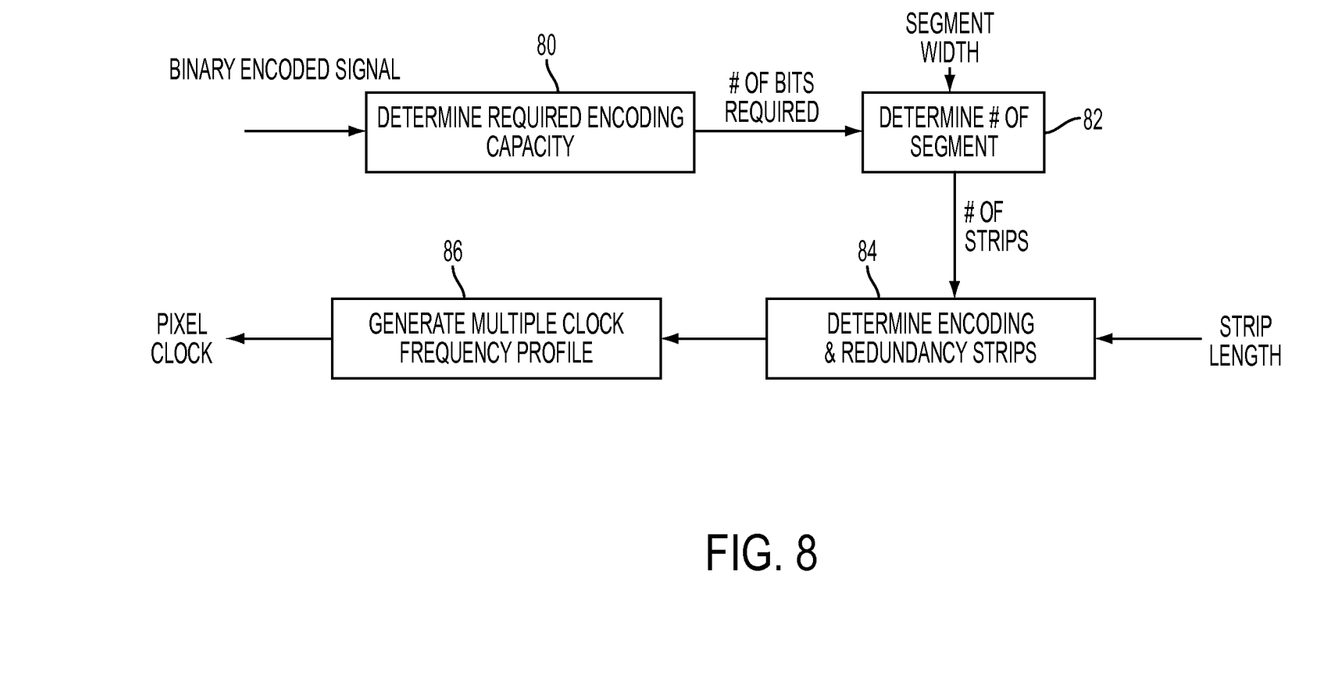
FIG. 8 is a flow chart of an exemplary embodiment of encoding a watermark via clock frequency variation.

FIG. 8 is a flow chart of an exemplary method of encoding a watermark into an image for rendering on an image output device according to this disclosure.

Initially, a binary encoded signal is generated, which represents a watermark.

Then, the method determines 80 the required encoding capacity encoded signal. In other words, what is the number of bits required to encode the watermark.

Next, based on a predetermined segment width representing a bit, the method determines 82 the number of segments necessary to encode the watermark, which leads to determining the number of strips necessary to encode the watermark.

Next, based on the number of strips required and an associated strip length, the method generates 84 the encoded strips, optionally including redundant strips to provide robustness.

Finally, a pixel clock frequency profile is generated 86 as a function of the encoded strips, which is used to drive a pixel clock for rendering the watermark and an associated image.

Figure 9:
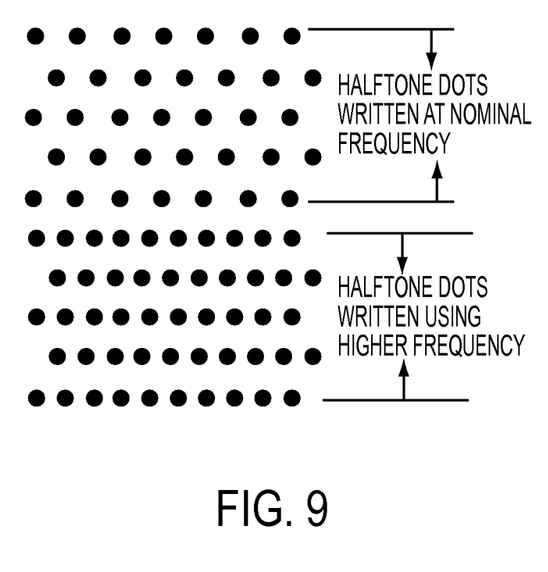
FIG. 9 illustrates the impact of frequency variation on halftone dots (or dot centers). Note—frequency difference is exaggerated for illustration purposes.

FIG. 9 shows an exaggerated halftone dot structure which is provided to illustrate the impact of frequency variation on halftone dots according to this disclosure.

As previously discussed, according to one exemplary embodiment of this disclosure, pixel clock frequency modulation is applied to an image, in addition to any needed compensation so that the pixel location and pixel spacing is modulated leading to a modulation of halftone frequency encoding a watermark within the image. Hence, detecting the halftone frequency change from segment to segment from scanned halftone prints, encoded invisible clockmarks can be decoded.

In "Geometric distortion signatures for printer identification," O. Bulan, J. Mao, and G. Sharma, in Proc. IEEE International Conference Acoustics Speech and Signal Processing, Apr. 19-24, 2009, Taipei, Taiwan, pages 1401-1404., Sharma and Bulan examined print image distortions as a means of printer identification. They relied upon existing distortions such as ROS bow to identify a printer, where the identification was primarily directed toward distinguishing a printer from others in a small group consisting of several models of printers.

In addition to providing a method of encoding a watermark via pixel space modulation, this disclosure provides a method for decoding an encoded watermark via spectral analysis of scanned halftoned prints. The method disclosed has been tested using real prints and the method is able to decode encoded clockmarks at 0.5% frequency variation where no IQ defects were observed, as previously described. The method requires no additional hardware over a system that has a variable pixel clock, see U.S. Pat. No. 4,860,237, issued Aug. 22, 1989, entitled "Scan Linearity Correction," by Curry.

The method includes the following 4 steps:
1) determine scanned image segments to be analyzed;
2) apply spectral analysis on the scanned image segments to extract their halftone frequencies;
3) detect halftone frequency shifts between segments and use the information to decode the clockmarks; and
4) verify the decoded bit streams using the redundancy used in the encoding process.

1) Determine Scanned Image Segments to be Analyzed.

Figure 5:
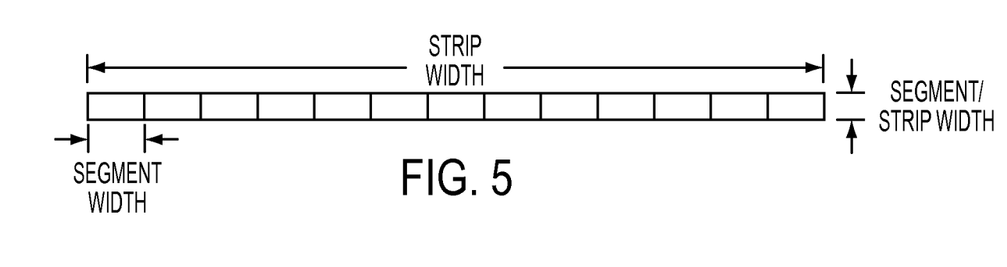
FIG. 5 shows a single strip from a scanned image with a predefined length, width and location on a page.

Initially, the scanned image segments containing the encoded data need to be isolated. According to one exemplary method of decoding, the image segment width and lengths are known from predefined data associated with the encoding method. In addition, the overall strip width and length are known from the predefined data as shown in FIG. 5.

According to one exemplary embodiment, the strips are referenced to paper edges. Segmentation is achieved by forming a grid over the page using the known dimensions. The subsequent frequency analysis should be robust to a few millimeters of error because the strip lengths are relatively large ($\approx 1''$) and a great deal of redundancy can be used for applications encoding a small number of bits, similar to yellow dot encoding.

According to another exemplary embodiment, reference marks are placed somewhere on the print so that the segmentation grid can be properly positioned. The reference mark may be in a variety of forms, including, but not limited to, Y dot, K dot, image edges, or known landmark in an image, such as border lines.

According to another exemplary embodiment, a method is provided where there is a lack of information present on the print indicating a reference starting position for a first strip. Notably, this situation is more challenging. One method to address these circumstances is to perform spectral analysis, such as the method provided below, for a variety of grid positions. The grid position that yields the best frequency separation for some number of image segments is then used for the grid segmentation and in-depth spectral analysis as described below.

2) Apply Spectral Analysis to the Scanned Image Segments to Extract Their Halftone Frequencies.

Spectral analysis is applied to each image segment to detect a frequency peak for the respective segments. To avoid image quality defects in the encoding process, the high and low halftone frequencies tend to be defined in a small range (e.g., 0.5 to 1% of nominal). Due to this small range, it is preferable to use a spectral analysis method that has high frequency resolution, such as the Yulear-Walker method. The Yulear-Walker method is applied to each image segment to detect a frequency peak within a pre-defined frequency range. The range should be around the nominal halftone frequency and include the expected frequency shift due to pixel clock frequency variation (e.g. $f_0 \pm \Delta f$, where $f_0$ is the halftone frequency when pixel clock is at the nominal frequency and $\Delta f$ is the range, such as 3~5 cpi.)

Figure 10:
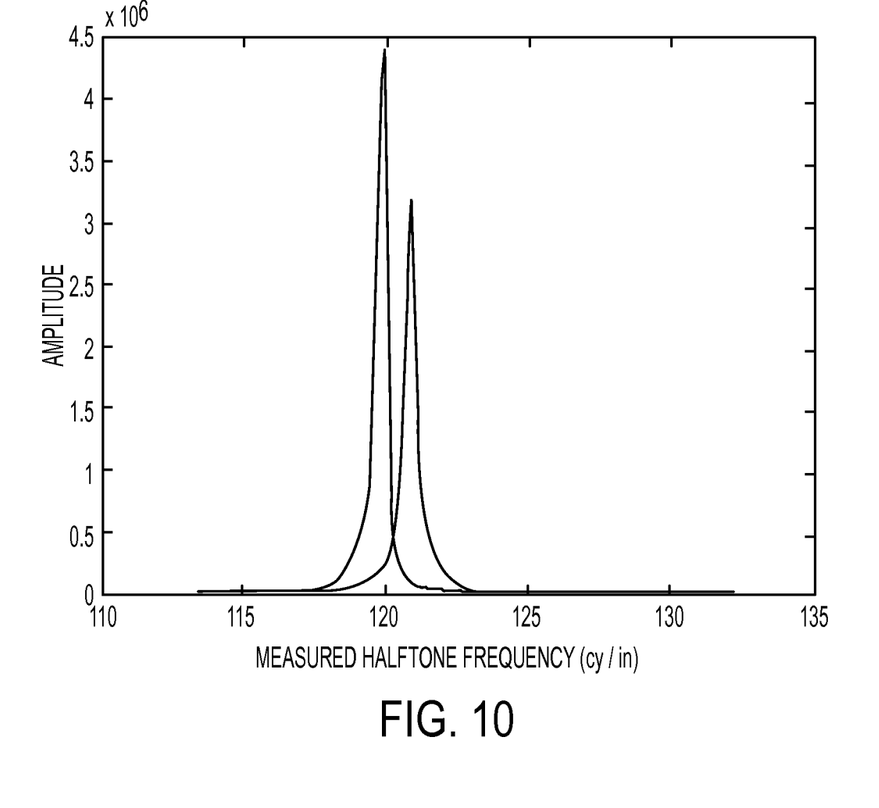
FIG. 10 illustrates the detected frequency peaks from two neighboring sections encoded with 1 and 0, according to an exemplary embodiment of this disclosure.

According to one exemplary embodiment, a halftone is used with a slightly nonorthogonal screen including fundamental frequencies of 170 cpi near 45°. Pixel rows intercept this halftone at $\approx 170$ cpi/$\sqrt{2}$=120.2 cpi. The frequency range of Yulear-Walker analysis in an experiment using this embodiment was $\pm 15$ cpi (larger than necessary). FIG. 10 shows the spectrum from two segments of a strip with a 1 and a 0 encoded bit pattern. The strip consisted of 50 scanlines and each of the two sections was 1" wide. The figure shows that Yulear-Walker spectral analysis can clearly separate the two frequency peaks.

Spectral analysis can be applied in one or more of several ways within each section. For example, for halftones with a frequency component (fundamental, harmonic, intercept frequency, . . . ) on the cross-process axis, one dimensional analysis may be applied to each scanline within the segment and the detected peak locations from all the scanlines can be averaged. Some spatial techniques for spectral analysis, such as the Yulear-Walker method, are relatively insensitive to phase discontinuities. This insensitivity allows the analysis to be performed on a longer data sequence formed by stringing together scanlines within a segment, in a head-to-tail manner. Experiments have shown that the connected scanlines can improve the resolution of peak location. As an alternative or in addition to Yulear-Walker spectral analysis, other spectral techniques, such as Fourier analysis may be use for determining peak locations. If more than one method is used, the estimate locations may be averaged in some weighted manner.

Two-dimensional frequency analysis may also be used on the two-dimensional segments to search for fundamental frequencies or harmonics, or both. Similar frequency analysis can be performed on color halftones where you search for a component of interest in the spectrum. In addition to fundamentals and harmonics, beat frequencies also occur in color halftones and may be used for frequency peak identification.

Since the encoding and decoding methods disclosed here depend on halftoned regions, non halftone regions should not be used to provide decoded information. According to another exemplary embodiment, frequency analysis is performed, and the result is not used if one of the expected frequencies is not found. According to another exemplary embodiment, the images are preprocessed into halftone and nonhalftone regions, and only the halftone regions are used for frequency peak detection.

3) Detect Halftone Frequency Shifts Between Segments use the Information to Decode the Clockmarks To decode the clockmarks, the detected frequency locations have to be converted into binary bits. One approach is to compare the detected peak locations to the high and low expected peak locations. Assign the peak for a given segment to the closer of the expected peaks, taking into account distortions in the printing process, such as paper shrinkage, which can shift both peaks. A calibration is performed to comprehend any differences between the idealized digital frequencies and the frequencies as they occur on the given printed media. Low or high or low frequency can be assigned to 0 or 1 according to the chosen convention. An alternative is to decode a frequency shift between segments as a 0 or 1 and a nonshift as the opposite. This alternative method depends on the encoding method following the same logic.

Figure 11:
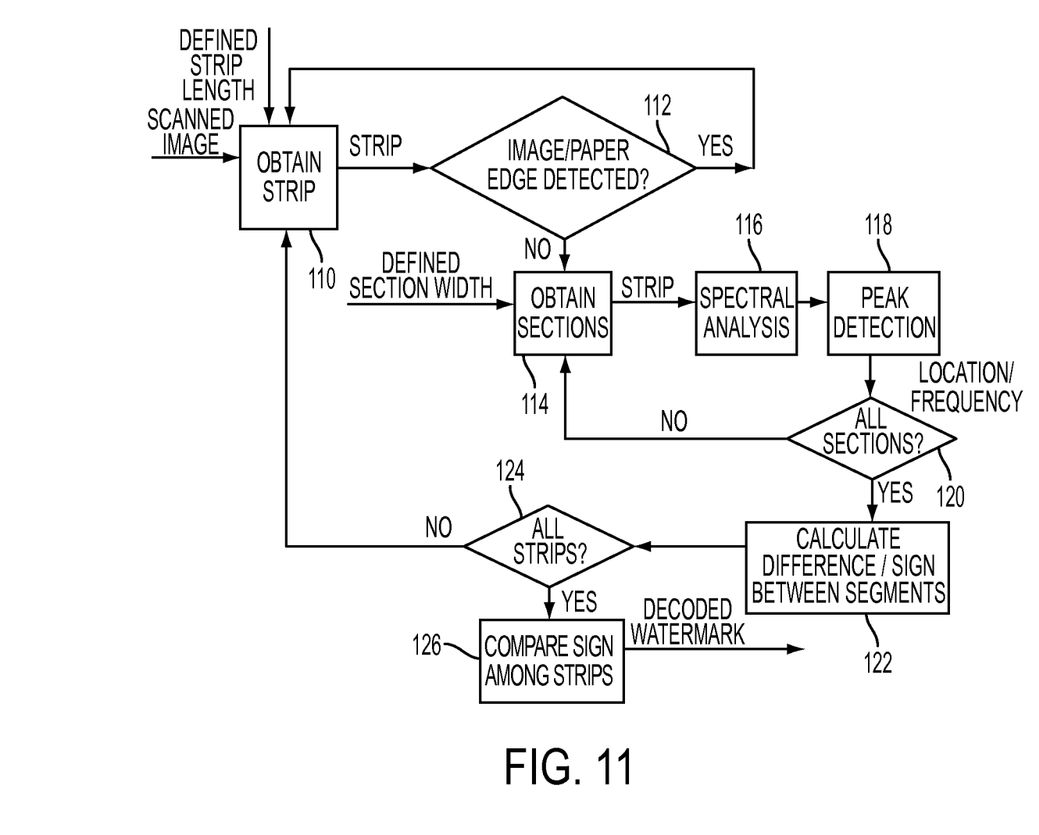
FIG. 11 is a flow chart of a watermark bit stream decoding process according to an exemplary embodiment of this disclosure.

The entire process is then repeated for all strips within the image as shown in FIG. 11. Some strips will be encoded with redundant information and those strips will be grouped together to decode the watermarks.

Initially, the process obtains a strip with a predefined length from the scanned image 110. The process then determines if the strip includes a paper edge or any non-halftoned areas 112. If the strip is suitable for watermark encoding, the process continues to 114, where the strip is partitioned into segments in the cross-process direction and the spectral analysis is performed in 116. From the spectral analysis, peak locations are detected 118 and the process is repeated for all the segments from the strip 120. In 122, the peak locations are then used to determine the signs of the watermark. When the entire image is processed 124, the process search for redundant strips to verify the decoded watermarks 126 and finally the decoded watermark is shown.

4) Verify the Decoded Bit Streams using the Redundancy used in the Encoding Process.

Because of image content, segmentation misalignment, noise in the marking process, and limitations in frequency resolution due to limited section width, the detected peak location can vary from section to section, or be missing entirely, even with the same encoded bit. Hence, it is necessary to build-in a great deal of redundancy during encoding process and use that redundancy to improve the confidence in an overall decoded bitstream. Techniques such as majority selection of bit level (greater number of 0's or 1's sets the value for a final bit), or weighted majority may be used, where weighting is assigned by confidence in the estimate of an individual decoded bit.

Experiment and Results

According to an experiment performed, the encoded bit pattern was the following: 0 1 1 0 0 1 1 0 0 1 1 0, The halftone nominally intersected the x-axis with a frequency of ≈120.2 cpi. The nominal low and high frequencies where varied by ±0.5% from the nominal to yield 119.6 and 120.8 cpi, respectively. Due to paper shrinkage and other physical distortions, a threshold of 120.4 cpi was used to separate detected low and high frequency segments. FIG. 12 shows 25 rows of segments and the average of columns of segments.

Applying the threshold to the averages yields the encoded bit pattern.

An alternative method to detect the bit pattern is to set up a threshold value of frequency difference between adjacent segments. If the frequency difference between adjacent segments is above a pre-defined threshold, then the bit pattern changes between zero and one, if not, then the bit pattern stays as one or zero. For this experiment, a threshold value of 0.3 cpi, which is about 0.25% of the average frequency, is a proper choice for most regions. For the columns which may result in ambiguous decisions, averages can be relied on as discussed above.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of decoding an encoded watermark within an image rendered on an image output device, the image output device associated with a pixel grid including a first predetermined number of substantially equally spaced pixels in a first direction, and a second predetermined number of substantially equally spaced pixels in a second direction for rendering the image, and the watermark encoded via pixel spacing modulation, the method comprising:
   a) scanning the image rendered on the image output device;
   b) determining one or more image segments associated with the scanned image that include the encoded watermark;
   c) applying spectral analysis to determine the pixel spacing associated with each of the one or more image segments;
   d) decoding the image segments to determine the coded watermark, the decoding based on the determined pixel spacing associated with each of the one or more image segments.

2. The method according to claim 1, wherein a pixel clock is operatively associated with the image output device to control the pixel spacing modulation.

3. The method according to claim 1, wherein the pixel grid is rectangular.

4. The method according to claim 1,
   wherein the image is rendered with a halftone representation of the image, the halftone representation including a nominal cross-process frequency component; and the watermark is encoded via modulating the cross-process frequency of the halftone representation to encode the watermark within a rendering of the halftone representation using the image output device.

5. The method according to claim 4, wherein the watermark is encoded into binary data, and encoded via modulating the halftone nominal cross-process frequency to encode the binary data.

6. The method according to claim 5, wherein the watermark binary data is converted to one or more watermark encoded frequency profiles, the one or more profiles driving one or more respective cross-process scan lines associated with the image output device.

7. The method according to claim 6, wherein the watermark encoded frequency profile is associated with a pixel clock operatively associated with the image output device to control the pixel spacing.

8. The method according to claim 6, further comprising:
   driving the cross-process scan lines using a cross-process nonlinearity correction profile associated with the image output device, and the one or more watermark encoded frequency profiles.

9. The method according to claim 5, wherein the halftone nominal cross-process frequency is modulated by 0.5% or less.

10. The method according to claim 1, wherein the watermark is encoded in one or more of a cross-process direction associated with the image output device and a process direction associated with the image output device.

11. The method according to claim 1, wherein the image output device is one of a ROS based printer, an inkjet printer and a display.

12. A printing apparatus comprising:
an image output device for rendering an image on a media substrate; and
a controller configured to receive a representation of an image for rendering on the image output device, the controller configured to execute instructions to decode an encoded watermark within an image rendered on the media substrate, the image output device associated with a pixel grid including a first predetermined number of substantially equally spaced pixels in a first direction, and a second predetermined number of substantially equally spaced pixels in a second direction for rendering the image and the watermark encoded via pixel spacing modulation, the method comprising:
a) scanning the image rendered on the image output device;
b) determining one or more image segments associated with the scanned image that include the encoded watermark;
c) applying spectral analysis to determine the pixel spacing associated with each of the one or more image segments;
d) decoding the image segments to determine the coded watermark, the decoding based on the determined pixel spacing associated with each of the one or more image segments.

13. The printing apparatus according to claim 12, wherein a pixel clock is operatively associated with the image output device to control the pixel spacing modulation.

14. The printing apparatus according to claim 12, wherein the pixel grid is rectangular.

15. The printing apparatus according to claim 12,
wherein the image is rendered with a halftone representation of the image, the halftone representation including a nominal cross-process frequency component; and the watermark is encoded via modulating the cross-process frequency of the halftone representation to encode the watermark within a rendering of the halftone representation using the image output device.

16. The printing apparatus according to claim 15, wherein the watermark is encoded into binary data and encoded via modulating the halftone nominal cross-process frequency to encode the binary data.

17. The printing apparatus according to claim 16, wherein the watermark binary data is converted to one or more watermark encoded frequency profiles, the one or more watermark encoded frequency profiles driving one or more respective cross-process scan lines associated with the image output device.

18. The printing apparatus according to claim 17, wherein the watermark encoded frequency profile is associated with a pixel clock operatively associated with the image output device to control the pixel spacing.

19. The printing apparatus according to claim 17, the method further comprising:
driving the cross-process scan lines using a cross-process nonlinearity correction profile associated with the image output device, and the one or more watermark encoded frequency profiles.

20. The printing apparatus according to claim 16, wherein the halftone nominal cross-process frequency is modulated by 0.5% or less.

21. The printing apparatus according to claim 12, wherein the watermark is encoded in one or more of a cross-process direction associated with the image output device and a process direction associated with the image output device.

22. The printing apparatus according to claim 12, wherein the image output device is one of a ROS based printer, an inkjet printer and a display.

23. A computer program product comprising:
a non-transitory computer-usable data carrier storing instructions that, when executed by a computer, cause the computer to perform a method of decoding a watermark within an image rendered on an image output device, the image output device associated with a pixel grid including a first predetermined number of substantially equally spaced pixels in a first direction, and a second predetermined number of substantially equally spaced pixels in a second direction for rendering the image and the watermark encoded via pixel spacing, the method comprising:
a) scanning the image rendered on the image output device;
b) determining one or more image segments associated with the scanned image that include the encoded watermark;
c) applying spectral analysis to determine the pixel spacing associated with each of the one or more image segments;
d) decoding the image segments to determine the coded watermark, the decoding based on the determined pixel spacing associated with each of the one or more image segments.

* * * * *